(12) United States Patent
Ehring et al.

(10) Patent No.: US 7,673,527 B2
(45) Date of Patent: Mar. 9, 2010

(54) FLOW CELL FOR MEASURING FLOW RATE OF A FLUID USING ULTRASONIC WAVES

(75) Inventors: Hanno Ehring, Uppsala (SE); Dan Hermansson, Uppsala (SE)

(73) Assignee: GE Healthcare Bio-Sciences AB, Uppsala (SE)

( * ) Notice: Subject to any disclaimer, the term of this patent is extended or adjusted under 35 U.S.C. 154(b) by 2 days.

(21) Appl. No.: 12/033,130

(22) Filed: Feb. 19, 2008

(65) Prior Publication Data

US 2008/0196511 A1 Aug. 21, 2008

(30) Foreign Application Priority Data

Feb. 20, 2007 (GB) .................................. 0703250.1

(51) Int. Cl.
*G01F 1/66* (2006.01)
*A01N 1/02* (2006.01)

(52) U.S. Cl. ........................................ 73/861.28; 435/2

(58) Field of Classification Search .. 73/861.25–861.31
See application file for complete search history.

(56) References Cited

U.S. PATENT DOCUMENTS

| | | | |
|---|---|---|---|
| 2,874,568 A | 2/1959 | Petermann | |
| 2,923,155 A | 2/1960 | Welkowitz | |
| 3,575,050 A | 4/1971 | Lynnworth | |
| 4,365,518 A * | 12/1982 | Zacharias, Jr. | 73/861.31 |
| 4,480,486 A * | 11/1984 | Meisser et al. | 73/861.28 |
| 5,179,862 A | 1/1993 | Lynnworth | |
| 5,458,004 A * | 10/1995 | van der Pol | 73/861.29 |
| 5,461,931 A * | 10/1995 | Gill | 73/861.28 |
| 5,463,906 A | 11/1995 | Spani | |
| 5,717,145 A * | 2/1998 | Yasuhara et al. | 73/861.29 |
| 5,728,948 A * | 3/1998 | Bignell et al. | 73/861.28 |
| 5,969,263 A * | 10/1999 | Ligneul et al. | 73/861.25 |
| 5,974,897 A * | 11/1999 | Koyano et al. | 73/861.29 |
| 6,457,371 B1 * | 10/2002 | Feller | 73/861.29 |
| 6,622,572 B2 * | 9/2003 | Kobayashi et al. | 73/861.29 |
| 6,820,500 B2 * | 11/2004 | Wilda | 73/861.29 |
| 7,213,468 B2 * | 5/2007 | Fujimoto | 73/861.27 |
| 7,383,741 B2 * | 6/2008 | Fukano et al. | 73/861.27 |
| 2003/0107467 A1 | 6/2003 | Bonne | |

FOREIGN PATENT DOCUMENTS

| | | |
|---|---|---|
| EP | 1 760 436 | 3/2007 |
| GB | 2 282 223 | 3/1995 |
| GB | 2 299 860 | 10/1996 |
| WO | WO92/00507 | 1/1992 |

\* cited by examiner

*Primary Examiner*—Harshad Patel
(74) *Attorney, Agent, or Firm*—Yonggang Ji

(57) ABSTRACT

The invention relates to a flow cell for an ultrasonic flow meter comprising two transducers of ultrasonic waves wherein the two transducers are reversibly detachable from the flow cell. The flow cell with the transducers detached is sterilisable and is particularly suitable for use in disposable or single-use systems.

8 Claims, 5 Drawing Sheets

FLOW CELL FOR MEASURING FLOW RATE OF A FLUID USING ULTRASONIC WAVES

FIELD OF THE INVENTION

The present invention relates to a polymer based flow cell for an ultrasonic flow meter and its manufacturing methods. The flow meter is suitable for use in disposable systems for analysis, purification or preparation of bio molecules like proteins and nucleic acids, for example by the use of chromatography or filtration.

BACKGROUND OF THE INVENTION

There is a large volume of literature related to ultrasonic flow meters. U.S. Pat. Nos. 2,874,568 and 2,923,155 describe ultrasonic flow meters in which the probes do not pierce the conduit wall, but rather are mounted external to the wall. With these arrangements the angle of refraction of the longitudinal wave at the interface between the conduit and fluid is relatively small and hence the ultrasonic waves have only a very minor velocity component in a direction parallel to the axis of fluid flow. With such systems, sensitivity, particularly to low flow rates, is a significantly limiting factor. In U.S. Pat. No. 3,575,050, the flow meter employs ultrasonic waves in the longitudinal mode transmitted diagonally across the conduit such that there is a significant component of the velocity in a direction parallel to the axis of flow of the fluid. This is achieved with transducers mounted external to the conduit and hence there is no perturbation of the flow of the fluid stream. The transducers include a generator/receiver of shear mode ultrasonic waves which is coupled to the conduit such that the shear waves are obliquely incident on the interface between the conduit and the fluid. These shear waves are mode converted by refraction at the interface into longitudinal waves, which are now transmitted at a much higher angle, typically twice that achievable with an incident longitudinal wave, through the fluid material. For measurement of the flow rate, the difference in transit time between a longitudinal wave travelling downstream and one travelling upstream provides the basis for a determination of the average flow rate. This determination of transit time may be made, for example, by clocking the time difference between two pulses or alternatively by measuring the phase shift between emitted continuous waves or bursts of continuous wave energy. Since the ultrasonic waves being transmitted through the fluid have a larger component of velocity in a direction parallel to the axis of flow, the sensitivity of the measurement is increased.

In a commercially available ultrasonic flow meter (M-2000 Series, Malema Sensors, Boca Raton, Fla., USA), two ultrasonic transducers are mounted so that the ultrasonic waves travel in parallel with the axis of the flow cell channel. Accordingly, the ultrasonic waves travel in parallel with the flow direction, so that the sensitivity of the measurement is maximized. There are further advantages related to the use of such a relative positioning of the transducers of ultrasonic waves, and the fact that the ultrasonic waves travel in a direction in parallel with the axis of the flow cell channel. For a traditional "clamp on" ultrasonic flow meter, the angle of refraction of the longitudinal wave at the interface between the conduit and fluid is relatively small and hence the ultrasonic waves have only a very minor velocity component in a direction parallel to the axis of fluid flow. U.S. Pat. Nos. 2,874,568 and 2,923,155 describe ultrasonic flow meters in which the probes do not pierce the conduit wall, but rather are mounted external to the wall. With these arrangements, as the material of the conduit wall, or pipe wall, is different from the fluid flowing within the pipe, the different acoustic properties of the two materials will cause an angular deflection of the beam of ultrasonic radiation according to Snell's law. Accordingly, this deflection will vary according to which fluid is flowing within the pipe. This may not be a problem for flow measurement in systems where the fluid composition remains essentially the same over time, for example in oil supply pipes, or for measurement of drinking water supply. In such systems, the deflection angle according to Snell's law will remain relatively constant over time. However, in systems for analysis, purification or preparation of bio molecules like proteins and nucleic acids, such as by the use of chromatography or filtration (for example by the use of membranes), the fluid composition may change significantly even within the time of a single separation experiment. In chromatography, solvent and salt gradients are used on purpose to speed up separations and to obtain improved resolution of the separation. Typical examples of solvent gradients include raising the concentration of an organic solvent (such as methanol or acetonitrile) from 0% at the start of the gradient to 80% at the end of the gradient. Typical examples of salt gradients include raising the concentration of a salt (such as NaCl) from 0 M at the start of the gradient to 2 M at the end of the gradient. The gradient time can be the full run time of the experiment, or just a part of the run time of the experiment. Due to the geometric arrangement of traditional "clamp on" ultrasonic flow meters, the apparent measured flow rate will then differ as the composition of the fluid is changed. However, this effect will be minimized with a flow meter arrangement wherein the ultrasonic transducers are axially aligned, positioned opposite each other and in axial alignment with the flow cell channel, because the angle of refraction of the longitudinal wave at the interface between the conduit (or pipe) and fluid is 90 degrees and, additionally, the ultrasonic waves velocity component is mainly in a direction parallel to the axis of fluid flow.

However, the ultrasonic flow meters described in the literature (e.g., U.S. Pat. Nos. 2,874,568; 2,923,155 and 3,575,050, and the published specifications for ultrasonic flow meters from Malema Sensors) are not suitable for systems used for analysis, purification or preparation of bio molecules like proteins and nucleic acids, for example by the use of chromatography or membrane filtration. Thus, despite the frequent use of flow meters in separation systems, such as chromatography systems, there are no publications recommending the use of ultrasonic flow meters in such systems. These systems require better than 5% accuracy at all flow rates within the range 25 ml/min up to 9 L/min. Furthermore, the backpressure from the flow cell should be less than 0.4 Bar for flow rates ranging from 25 ml/min up to 9 L/min, and the bandbroadening effect of the flow meter must be less than 10% for chromatographic separation, operating at flow rates within the range 25 ml/min to 9 L/min. Preferably the material of the flow cell should be characterized by low damping of ultrasonic waves, in order to increase the sensitivity. More preferably, the material should also be suitable for disposable or single-use systems, for example, it should be relatively inexpensive, sterilisable and ideally combustible.

U.S. Pat. No. 5,463,906, for example, discloses a disposable flow cell assembly which serves as an acoustic chamber for use with an ultrasonic flowmeter for the measurement of blood flow. Acoustic-coupling bodies having an acoustic impedance similar to blood, which is different to the acoustic impedance of the plastic from which the bulk of the flow body is normally constructed, are used to avoid substantial refraction or reflection regardless that the angle between the acoustic vector and the wall(s) of the flow chamber is not a right angle. The presence and design of these acoustic coupling bodies also prevents the production of eddies or whirlpools which might otherwise damage the blood cells or induce clots. While the flow cell assembly described in U.S. Pat. No. 5,463,906 is designed to measure the flow rate of blood it would not be suitable for use in measuring the flow rate where fluid compositions may change, such as in chromatography and filtration applications.

There is a significant interest in disposable systems, in particular for use in strictly regulated processes, for example separation or purification of chemicals, bio molecules or other components for use in pharmaceutical applications. Materials used in such systems preferably fulfil the requirements of United States Pharmacopeia (USP) class VI to guarantee that they do not release harmful substances during use. Such systems should also provide a sterilised environment in order to meet the strict requirements for such applications. Accordingly, it should be possible to sterilise the system, for example by the use of gamma irradiation. Sterilisation is here construed to mean a reduction in microbial population or load. However, most users do not have the possibility to perform gamma irradiation sterilisation in their laboratories. Further, most users do not want to perform gamma irradiation sterilisation in their laboratories, due to the potential health hazards associated with such processes. Therefore, they will prefer to buy validated sterilised disposable equipment from commercial suppliers. While it is possible to sterilise equipment by the use of antimicrobial agents in solution, this requires the use of a multi step cleaning procedure and this is a disadvantage.

Another disadvantage associated with prior art ultrasonic flow meters is that on exchange or replacement of flow meters, recalibration is required because the internal diameter of the flow cell channel varies considerably from flow cell to flow cell. As will be understood by the skilled person, this is particularly a problem for "clamp-on" ultrasonic flow meters which are attached to existing pipes (e.g. oil supply pipes) or conduits. This is a time consuming exercise which may be acceptable for flow cells which are to be used for long periods of time but is not acceptable for disposable and/or sterilised flow cells which may only be used for a single run or a short period of time.

SUMMARY OF THE INVENTION

One object of the present invention is to provide a flow meter with a flow cell (10) suitable for use in disposable systems, in particular for use in strictly regulated processes, for example separation or purification of chemicals, bio molecules or other components for use in pharmaceutical applications. Materials used in such systems preferably fulfill the requirements of USP class VI to guarantee that they do not release harmful substances during use. Such systems should also provide a sterilised environment in order to meet the strict requirements for such applications. Accordingly, it should be possible to sterilise the system, for example by the use of gamma irradiation. For economical reasons, instead of making the complete system disposable, it makes sense to make only the wetted parts of the system disposable. However, a further disadvantage with the existing ultrasonic flow meters having an axial alignment of the transducers is that the ultrasonic transducers are not reversibly detachable from the flow cell. By reversibly detachable it is meant that the transducer may be detached and then reattached to the same or a different flow cell.

Accordingly, in a first aspect of the present invention there is provided a flow cell (10) for measuring the flow rate of a fluid comprising a fluid inlet and a fluid outlet separated by a sample flow-through channel (13) having an essentially straight part (12) therein, said flow cell further comprising two transducers (11) of ultrasonic waves axially aligned with each other on opposite sides of said channel (13) wherein the ultrasonic waves transmitted by said transducers travel longitudinally in opposite directions in parallel with the flow direction through said essentially straight part (12) of said channel (13), said two transducers (11) of ultrasonic waves being reversibly detachable from the flow cell, wherein the angle of refraction of said longitudinal wave at the interface between the essentially straight part (12) of the channel (13) and said fluid is essentially 90°.

In the present invention the ultrasonic transducers (11) are substantially positioned in axial alignment, opposite each other, separated by a substantially straight part (12) of a flow cell channel (13). The ultrasonic transducers (11) are separated from the fluid inside the flow cell channel (13) by at least one plug (14), or a wall (15), to ensure that the ultrasonic transducers (11) do not come in direct contact with the fluid inside the flow cell channel (13). The ultrasonic transducers (11) are easily detachable from the flow cell (10) to facilitate exchange from a used flow cell (10) to a sterilised flow cell (10) between experiments, at a reasonable cost and within a reasonable time frame. In one embodiment of the present invention the ultrasonic transducers (11) are fastened to the flow cell (10) with the use of at least one bayonet joint (16) to facilitate easy fastening and detachment of the transducers (11), but other releasable fastening means, for easy attachment and/or easy detachment, are possible (e.g., snap fit, clip on, screw on).

The essentially straight part (12) of the flow cell channel (13) can have a length (L) between 3 and 30 cm, preferably between 10 and 25 cm, more preferably between 10 and 20 cm, even more preferably between 13 and 17 cm. The cross section of the channel (13) is typically shaped as a circle, but any geometry shape, for example a rectangle, should be considered to be within the scope of the present invention. In one embodiment of the present invention, the cross section of the channel (13) is shaped as a circle and the channel (13) has the form of a cylinder. The diameter (D) of the channel (13) can be between 1 and 16 mm, more preferably between 3 and 10 mm, even more preferably between 4 and 7 mm. Due to the axial alignment of the ultrasonic transducers (11) and the dimensions of the flow cell channel (13), i.e. cross sectional area and length of the flow cell channel (13), a flow meter using a flow cell (10) with dimensions falling within the above mentioned ranges fulfils the requirements: the flow meter accuracy is better than 5% at all flow rates within the range 25 ml/min up to 9 L/min. Furthermore, the backpressure from the flow cell (10) is less than 0.4 Bar for flow rates ranging from 25 ml/min up to 9 L/min (aqueous solutions). Additionally, the flow cell channel (13) geometry is designed to eliminate dead volume. Due to this, and also due to the selected proportions (i.e. cross sectional area and length) of the flow cell channel (13), the bandbroadening effect of the flow cell (10) according to the present invention has been calculated to be less than 10% for chromatographic separation operating at flow rates within the range 25 ml/min to 9 L/min.

In one aspect, the internal diameter of the essentially straight part (12) of the channel (13) changes by no more than 1%. The advantage of such a flow cell is that it need not be recalibrated every time that the flow cell is exchanged or replaced. This is particularly advantageous for flow cells which are used in disposable systems.

The essentially straight part (12) of the channel (13) may preferably have a length of between 10 and 30 cm. The cross section of the essentially straight part (12) of the channel (13) may take many shapes, including but not limited to rectangular, ovoid and square. Preferably it will be shaped as a circle and the diameter of the circle is between 4 and 12 mm.

In one aspect, the flow cell with the transducers detached (i.e. when the transducers are not attached to the flow cell) is produced from a polymeric material. Preferably, the flow cell is produced from a single polymeric material. More preferably, the polymeric material fulfils the requirements for USP class VI.

In one embodiment of the present invention, the flow cell (10) with the transducers detached is made of polymethylpentene (TPX polymethylpentene RT18XB, Mitsui Chemicals, Japan). Polymethylpentene (TPX) provides low damping of ultrasonic waves. Furthermore, polymethylpentene (TPX) is injection mouldable and inexpensive both as raw material and to process. Additionally, polymethylpentene (TPX) is USP VI classified which makes it suitable for use in systems operating in strictly regulated environments.

A flow cell (10) according to the present invention with the transducers detached (i.e. when these are not attached) can be manufactured by the use of moulding. Further, a flow cell (10) according to the present invention with the transducers detached can be manufactured by the use of injection moulding. The flow cell (10) may be moulded in one single piece, but it is also possible to assemble the flow cell (10) from several parts. The channels (13) of the flow cell (10) can be drilled, but any other processing method known to the person skilled in the art, for example cutting, milling, eroding etc., should be considered to be within the scope of the present invention.

In one aspect, the flow cell (10) with the transducers detached is sterilisable. Preferably, the flow cell is sterilisable with gamma irradiation. More preferably, the flow cell has been sterilised by gamma irradiation prior to use. Most preferably, the flow cell with the transducers detached has been sterilised by gamma irradiation prior to use.

In one aspect, the channel (13) is separated from the transducers (11) of ultrasonic waves by a plug (14) and/or a wall (15).

Preferably, the flow cell is for use in chromatography or filtration.

In another aspect, the flow cell is for use in the separation of bio-molecules, such as proteins, peptides and nucleic acids. It will be understood that the flow cell may also be used in the separation of any analyte by chromatography or filtration.

According to a second aspect of the present invention, there is provided a method for manufacturing a flow cell with the transducers detached as hereinbefore described wherein the flow cell is made by moulding. This is advantageous because it is an inexpensive and simple process. In one aspect, the flow cell with the transducers detached is made by is made by injection moulding. In another aspect, the channel (13) in the flow cell is made by drilling or by cutting.

In a third aspect of the present invention, there is provided a method for measuring the flow rate of a fluid using a flow cell (10), the flow cell comprising a fluid inlet and a fluid outlet separated by a sample flow-through channel (13) having an essentially straight part (12) therein, the flow cell further comprising two transducers (11) of ultrasonic waves axially aligned with each other on opposite sides of said channel (13) wherein the ultrasonic waves transmitted by the transducers travel longitudinally in opposite directions in parallel with the flow direction through said essentially straight part (12) of said channel (13), the two transducers (11) of ultrasonic waves being reversibly detachable from the flow cell, wherein the angle of refraction of the longitudinal wave at the interface between the essentially straight part (12) of the channel (13) and the fluid is essentially 90°, the method comprising the steps of (a) flowing a fluid through the essentially straight part (12) of the channel (13);
(b) transmitting ultrasonic waves longitudinally through said fluid in the straight part (12) of the channel (13) from one or both said axially aligned transducers;
(c) receiving said ultrasonic waves by one or both axially aligned transducers; and
(d) calculating the flow rate of the fluid.

In one aspect, the internal diameter of the essentially straight part (12) of the channel (13) changes by no more than 1% and the method does not require calibrating the ultrasonic flow meter prior to use.

Preferably, the fluid contains an analyte of interest. More preferably, the analyte is a bio-molecule. Most preferably, the analyte is a molecule selected from the group consisting of protein, peptide, nucleic acid, oligonucleotide and polynucleotide. In a fourth aspect of the present invention, there is provided the use of a flow cell according as hereinbefore described in a chromatographic or filtration device.

DETAILED DESCRIPTION OF THE INVENTION

One of the objectives of the present invention is to provide a flow cell (10) for use in an ultrasonic flow meter, suitable for use in systems for separation and purification of chemicals, bio molecules or other components for use in pharmaceutical applications.

Figure 1:
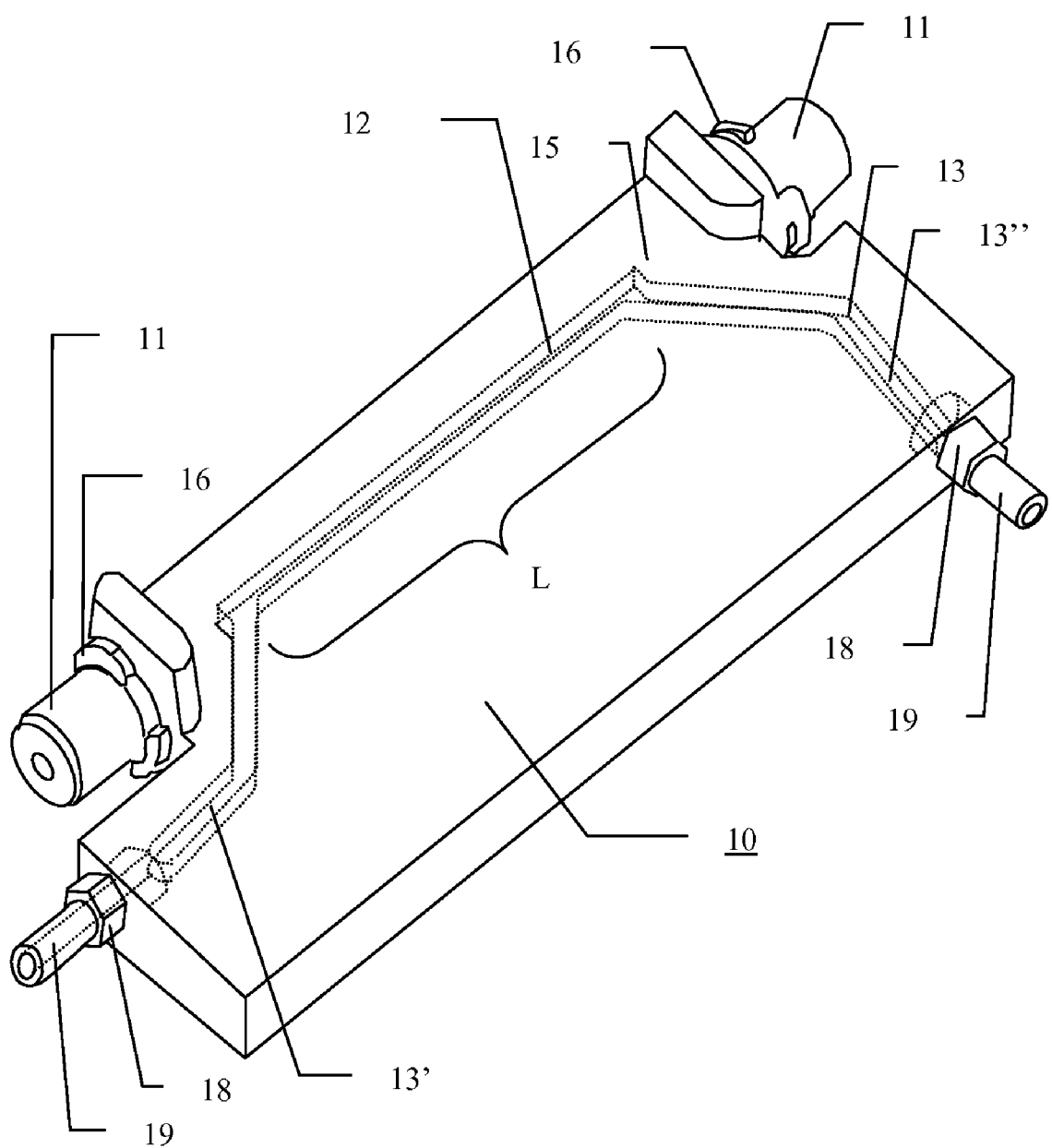
FIG. 1 depicts schematically in perspective one embodiment of an ultrasonic flow meter according to the present invention.

FIG. 1 is a schematic perspective view of an embodiment of a flow cell (10) according to the present invention. In the present invention the ultrasonic transducers (11) are positioned in alignment, opposite each other, separated by an essentially straight part (12) of a flow cell channel (13). The ultrasonic transducers (11) are positioned along the axis of the essentially straight part (12) of the flow cell channel (13). The flow cell channel can also be defined as a chamber. The flow cell channel (13) can be of any geometrical shape. Typically, the flow cell channel (13) is formed as a chamber surrounded by a wall (15), with an inlet (13') portion intended to receive a flow of liquid into the flow cell (10) and an outlet (13") portion intended to deliver a flow of liquid out from the flow cell (10). The inlet (13') portion and the outlet (13") portion are connected from the side to the essentially straight part (12) of the flow cell channel (13) positioned between the two ultrasonic transducers (11). The inlet (13') portion and the outlet (13") portion are provided with connectors (18) to facilitate coupling to channels for liquid flow (19). The ultrasonic transducers (11) are separated from the fluid inside the flow cell channel (13) by a wall (15), to ensure that the ultrasonic transducers (11) do not come in direct contact with the fluid inside the flow cell channel (13). The ultrasonic transducers (11) are detachable from the flow cell (10) to facilitate exchange of sterilised flow cells (10) between experiments, at a reasonable cost and within a reasonable time frame. In this embodiment of the present invention each ultrasonic transducer (11) is fastened to the flow cell (10) by one bayonet joint (16) to facilitate easy detachment of the transducers (11). Each transducer can act as a transmitter and a receiver of ultrasonic vibration, and in use alternate between the modes, such that when one transducer is in transmitter ultrasound mode the other is in receiving mode.

In order to allow high sensitivity and good resolution, the flow cell (10) plug (14) or wall (15) is made of a material providing low damping of ultrasonic waves. Preferably, this material should also be suitable for use in disposable systems. Furthermore, the backpressure from the flow cell should be less than 0.4 Bar and the bandbroadening effect of the flow cell should be insignificant both for analytical and preparative purposes of chromatographic separation. In order to fulfill these requirements for sensitivity, band broadening, and backpressure, the essentially straight part (12) of the flow cell channel (13) can have a length (L) between 3 and 30 cm, preferably between 10 and 25 cm, more preferably between 10 and 20 cm, even more preferably between 13 and 17 cm.

Figure 2:
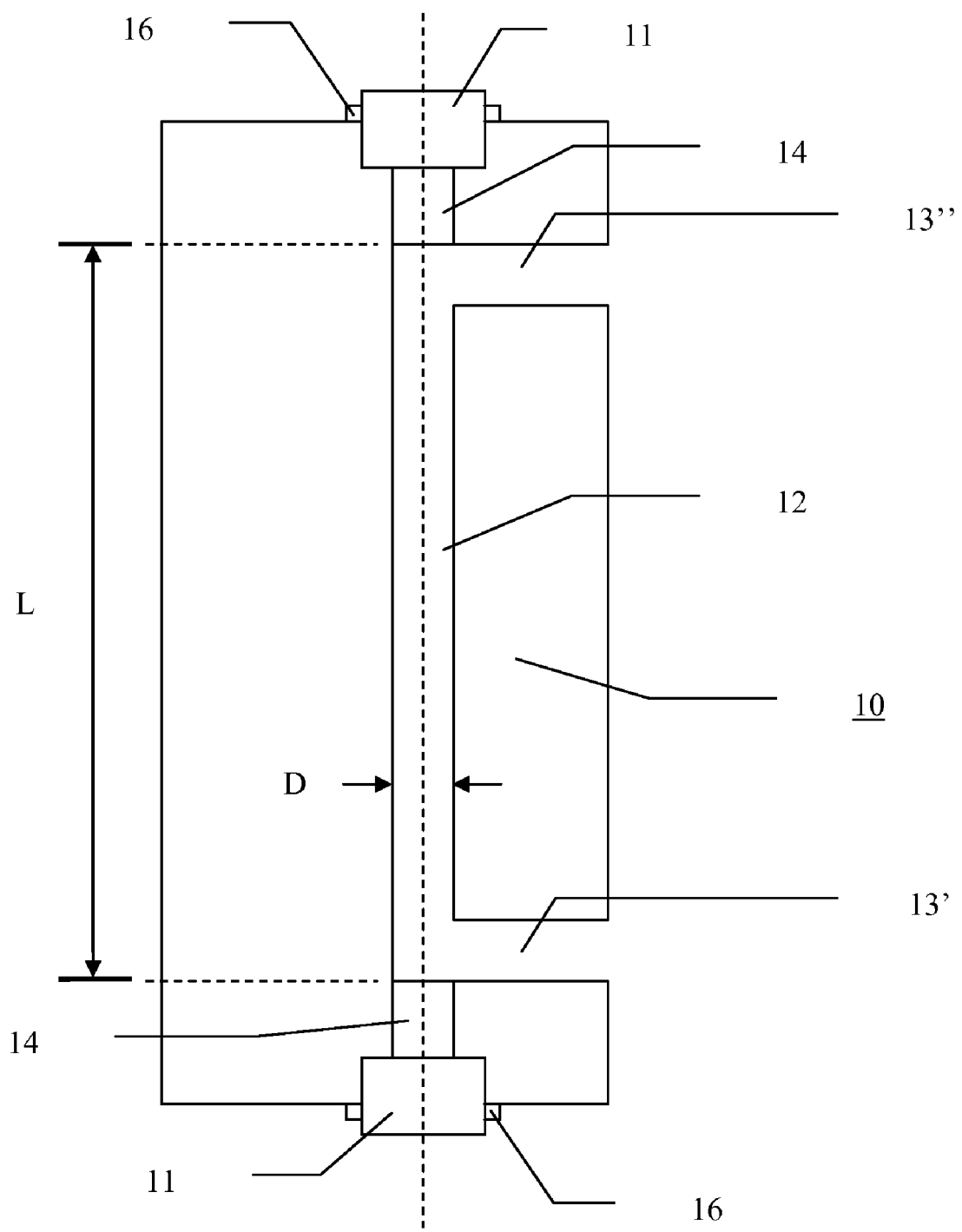
FIG. 2 is a schematic plan view of a second embodiment of an ultrasonic flow meter according to the present invention.

FIG. 2 is a schematic plan view of a second embodiment of a flow cell (10) according to the present invention. The ultrasonic transducers (11) are positioned in alignment, opposite each other, separated by an essentially straight part (12) of a flow cell channel (13). The ultrasonic transducers (11) are positioned along the axis of the essentially straight part (12) of the flow cell channel (13). The ultrasonic transducers (11) are separated from the fluid inside the flow cell channel (13) by at least one plug (14), to ensure that the ultrasonic transducers (11) do not come in direct contact with the fluid inside the flow cell channel (13). The ultrasonic transducers (11) are detachable from the flow cell (10). The cross section of the channel (13) is typically shaped as a circle, but any geometry shape, for example a rectangle, should be considered to be within the scope of the present invention. In one embodiment of the present invention, the cross section of the channel (13) is shaped as a circle and the channel (13) has the form of a cylinder. The diameter (D) of the channel (13) can be between 1 and 16 mm, more preferably between 3 and 10 mm, even more preferably between 4 and 7 mm. In one embodiment according to the present invention, the diameter (D) of the channel (13) is 4 mm. In one further embodiment according to the present invention, the diameter (D) of the channel (13) is 7 mm. At flow rates within the range 25 ml/min to 9 L/min, the backpressure of the flow cell (10) according to the present invention has been calculated to be less than 0.4 Bar, due to the selected proportions (i.e. cross sectional area, shape and length) of the flow cell channel (13). Furthermore, also due to the selected proportions (i.e. cross sectional area and shape, and length) of the flow cell channel (13), the bandbroadening effect of the flow cell (10) according to the present invention has been calculated to be less than 10% for chromatographic separation operating at flow rates within the range 25 ml/min to 9 L/min.

Figure 3A:
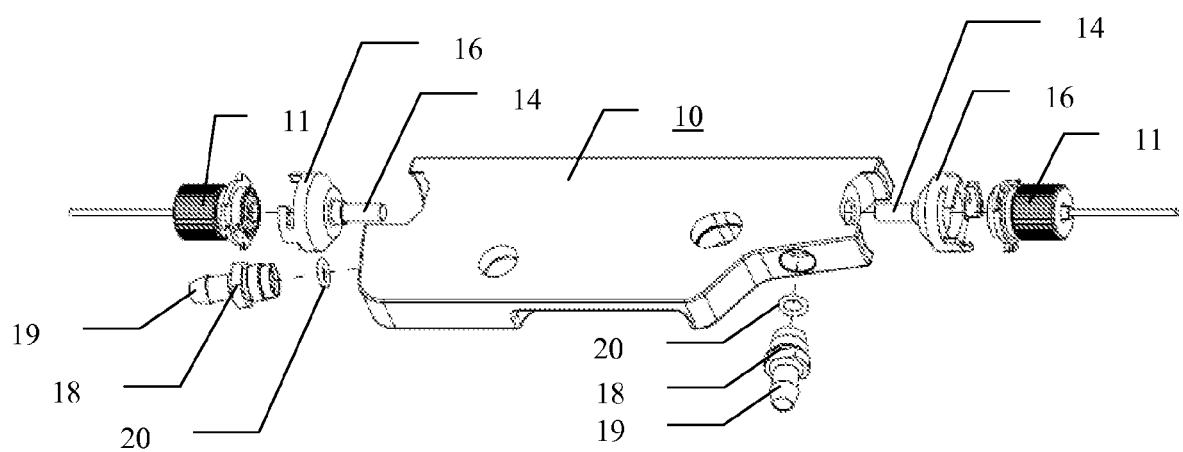
FIG. 3a) is an exploded perspective view of a third embodiment of an ultrasonic flow meter according to the present invention.

FIG. 3a) is an exploded perspective view of a third embodiment of an ultrasonic flow meter according to the present invention. The figure shows ultrasonic transducers (11) and bayonet joints (16) for coupling to the flow cell (10) with plugs (14), connectors (18) for coupling of the flow cell (10) to another channel for liquid flow (19) and a sealing O-ring (20).

Figure 3B:
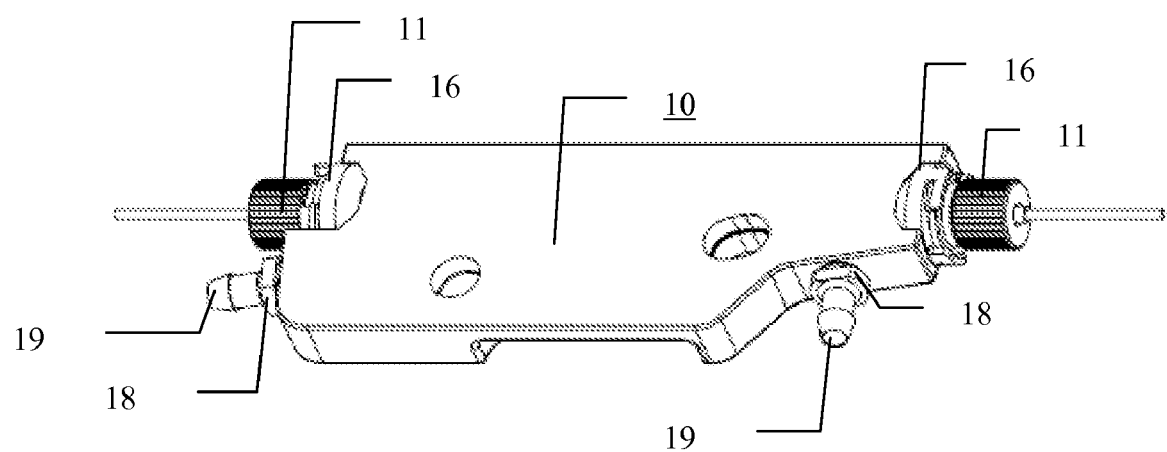
FIG. 3b) is a perspective view of the third embodiment of the ultrasonic flow meter according to the present invention.

FIG. 3b) is a perspective view of the third embodiment of the ultrasonic flow meter according to the present invention. The figure shows ultrasonic transducers (11) and bayonet joints (16) for coupling to the flow cell (10), and connectors (18) for coupling of the flow cell (10) to another channel for liquid flow (19).

Figure 3C:
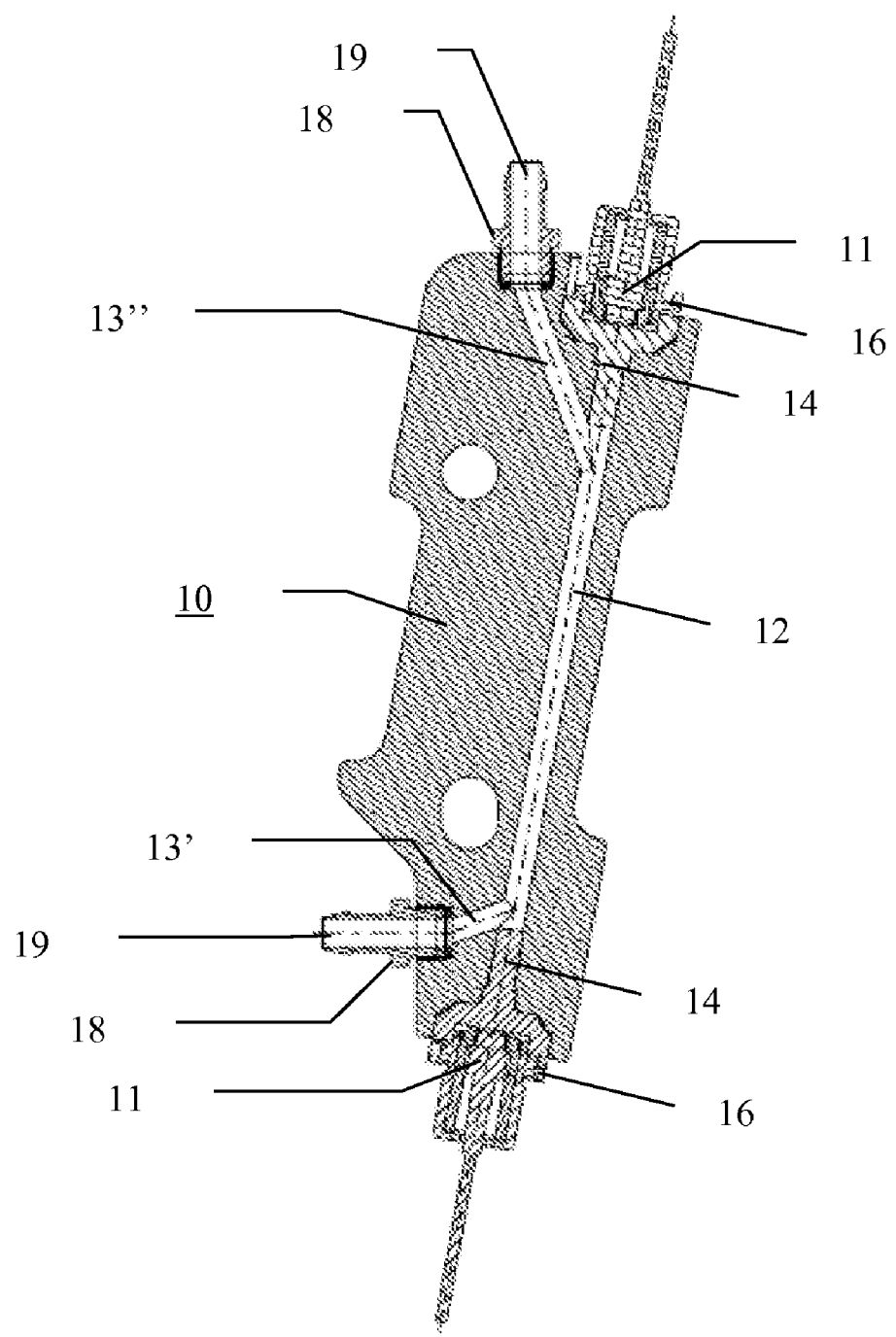
FIG. 3c) is a cross sectional view of the third embodiment of the ultrasonic flow meter according to the present invention.

FIG. 3c) is a cross sectional view of the third embodiment of the ultrasonic flow meter according to the present invention. The figure shows a flow cell (10) with ultrasonic transducers (11) and bayonet joints (16) with plugs (14) for coupling to the essentially straight channel (12), and connectors (18) for coupling of the flow cell (10) to another channel for liquid flow (19), via an inlet portion (13') and an outlet portion (13").

In one embodiment of the present invention, the flow cell (10) is made of polymethylpentene (TPX polymethylpentene RT18XB, Mitsui Chemicals, Japan).

The flow cell (10) according to the present invention can be manufactured by the use of moulding. Further, the flow cell (10) according to the present invention can be manufactured by the use of injection moulding. The flow cell (10) may be moulded in one single piece, but it is also possible to assemble the flow cell (10) from several parts. The channels (13) of the flow cell (10) can be drilled, but any other processing method known to the person skilled in the art, for example cutting, should be considered to be within the scope of the present invention.

In one method for manufacturing a flow cell (10) according to the present invention the sample flow-through chamber (12) is separated from the transducers (11) of ultrasonic waves by the use of a plug (14) or a wall (15).

It is possible to connect the flow cell (10) with at least one connector (18) to another channel for liquid flow (19), and this at least one connection (18) prevents leaks at pressures up to 10 Bar.

The flow cell (10) according to the present invention is suitable for measuring the flow rate of a fluid. The flow cell (10) according to the present invention is in particular suitable for measuring the flow rate of a fluid in systems for separation or purification of chemicals, bio molecules, cells, or other biological constituents. The flow cell (10) according to the present invention is suitable for measuring the flow rate of a fluid in systems for chromatography.

The above examples illustrate specific aspects of the present invention and are not intended to limit the scope thereof in any respect and should not be so construed. Those skilled in the art having the benefit of the teachings of the present invention as set forth above, can effect numerous modifications thereto. These modifications are to be construed as being encompassed within the scope of the present invention as set forth in the appended claims.

What is claimed is:

1. A disposable flow cell (10) for measuring the flow rate of a fluid comprising:
    a fluid inlet and a fluid outlet separated by a sample flow-through channel (13) having an essentially straight part (12) therein; said flow cell includes two transducers (11) of ultrasonic waves axially aligned with each other on opposite sides of said channel (13); wherein ultrasonic waves transmitted by said transducers travel longitudinally in opposite directions in parallel with the flow direction through said essentially straight part (12) of said channel (13); the two transducers (11) of ultrasonic waves being reversibly detachable from the flow cell, wherein the angle of refraction of said longitudinal wave at the interface between the essentially straight part (12) of the channel (13) and said fluid is essentially 90°,
    wherein the channel is separated from the transducers (11) of ultrasonic waves by a plug (14) and wherein the flow cell with detached transducers (11) and the plug (14) are both produced from a single polymeric material.

2. The flow cell (10) of claim 1, wherein the essentially straight part (12) of the channel (13) has a length of between 10 and 30 cm.

3. The flow cell (10) of claim 1, wherein the cross section of the essentially straight part (12) of the channel (13) is shaped as a circle and the diameter of the circle is between 4 and 12 mm.

4. The flow cell (10) of claim 1, wherein said polymeric material fulfils the requirements for USP class VI.

5. The flow cell (10) of claim 4, wherein the polymeric material is polymethylpentene (TPX).

6. The flow cell (10) of claim 1, wherein the flow cell with detached transducers (11) has been sterilised by gamma irradiation.

7. The flow cell (10) of claim 1, for use in chromatography or filtration.

8. The flow cell (10) of claim 1, for use in the separation of bio-molecules.

* * * * *